Jan. 20, 1953 R. M. ALLRED 2,625,782
ASPARAGUS FERN CUTTER
Filed Feb. 25, 1948 2 SHEETS—SHEET 2

INVENTOR
R. M. Allred
BY
ATTORNEYS

Patented Jan. 20, 1953

2,625,782

UNITED STATES PATENT OFFICE 2,625,782

ASPARAGUS FERN CUTTER

Reed M. Allred, Stockton, Calif., assignor to Allred Bros., Stockton, Calif., a copartnership Application February 25, 1948, Serial No. 10,708

11 Claims. (Cl. 55—118)

The present invention is directed to, and it is an object to provide, an implement of novel construction and operation adapted to cut and chop or comminute asparagus fern; the fern being so chopped in order that it may be worked into the ground to supply humus thereto.

In the commercial growing of asparagus the plants are permitted to grow to a head or fern after the harvest, but which fern must be cut and disposed of before the next harvest season. The conventional practice is to mow the fern from the asparagus rows and to then pile and burn the cut fern; all an uneconomic procedure.

It is therefore another object of the invention to provide a tractor mounted, power driven implement operative to travel with the tractor along an asparagus row, cutting the asparagus fern close to the ground, and chopping the fern into relatively small pieces; such pieces being deflected into the ditches alongside the row to be subsequently plowed or disked into the ground for humus.

An additional object of the invention is to provide an asparagus fern cutting implement, as above, which comprises a rotary cutter drum and a cooperating cutter bar of novel construction; the assembly of said drum and bar floating so that it may closely follow ground contour along each row.

It is also an object to provide a rotary cutter drum, as in the preceding paragraph, including transverse, circumferentially spaced rows of blades radiating therefrom. The blades include cutting edges diagonal to the path of rotation, and the blades of alternate rows are canted laterally in opposite directions; the cutter bar being toothed in cooperative relation to the canted blades. The arrangement is such that the cutter bar teeth form shearing edges for the blades which cut to the right and those which cut to the left; all so that effective chopping or comminution is accomplished.

A further object of the invention is to provide a practical and reliable asparagus fern cutting and chopping implement, and one which will be exceedingly effective for the purpose of which it is designed.

These objects are accomplished by means of such structure and relative arrangement of parts as will fully appear by a perusal of the following specification and claims.

In the drawings:

Fig. 5 is an enlarged fragmentary elevation of the one-way clutch used between the drive and the rotary cutter drum.

Figure 1:
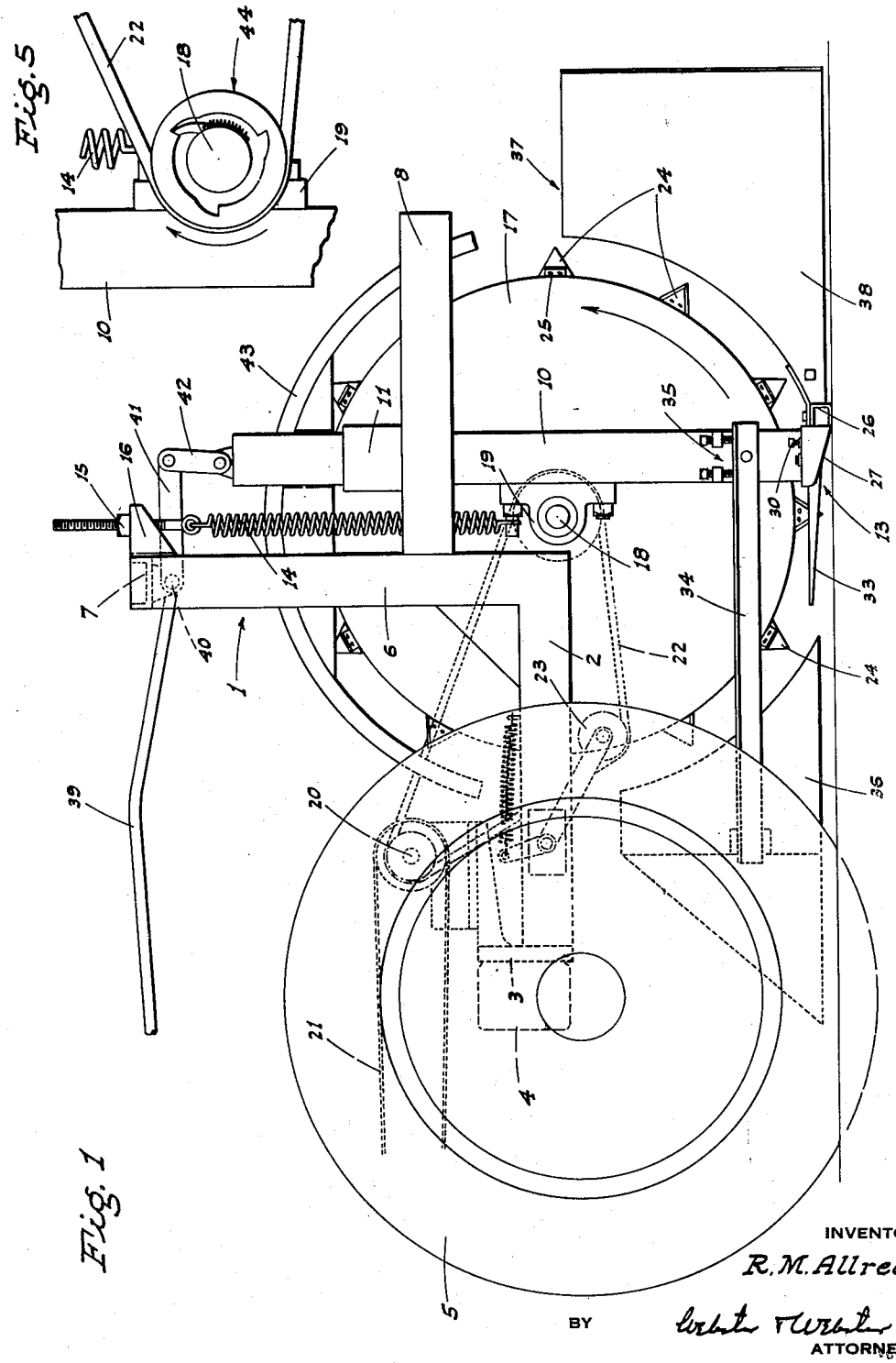
Fig. 1 is a side elevation of the implement as mounted on a tractor.
Figure 2:
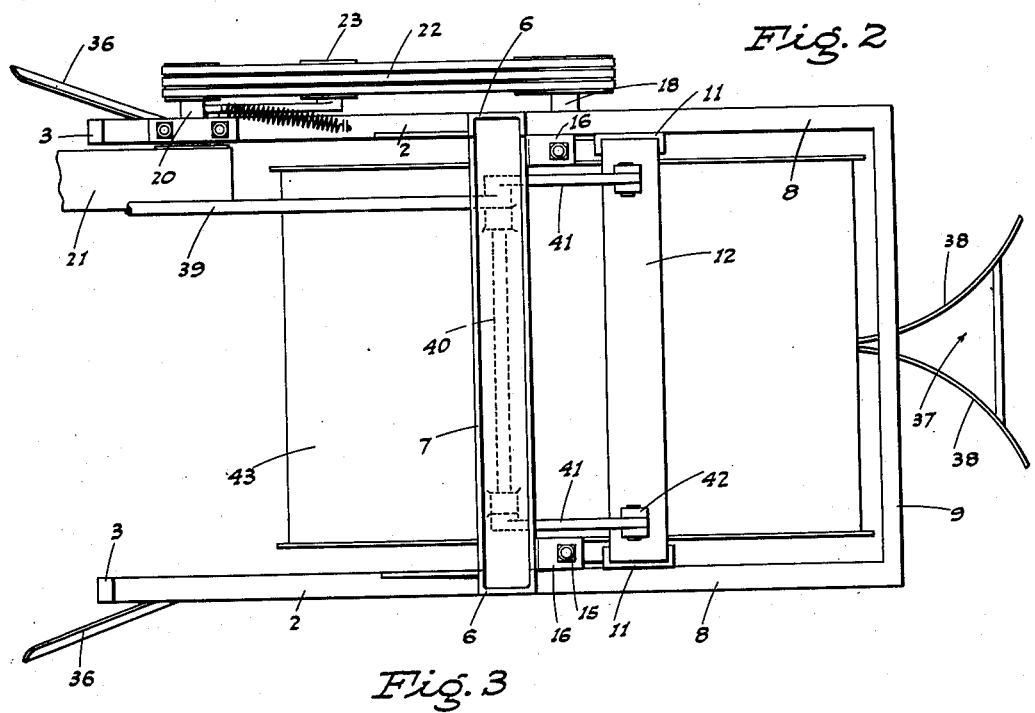
Fig. 2 is a fragmentary top plan view of the implement.
Figure 3:
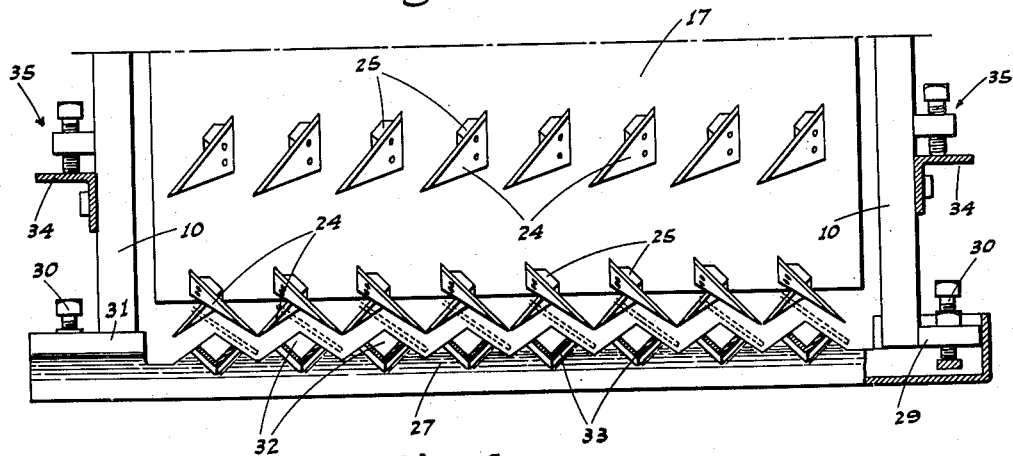
Fig. 3 is an enlarged fragmentary cross section illustrating particularly the assembly of the rotary cutter drum, and cutter bar.
Figure 4:
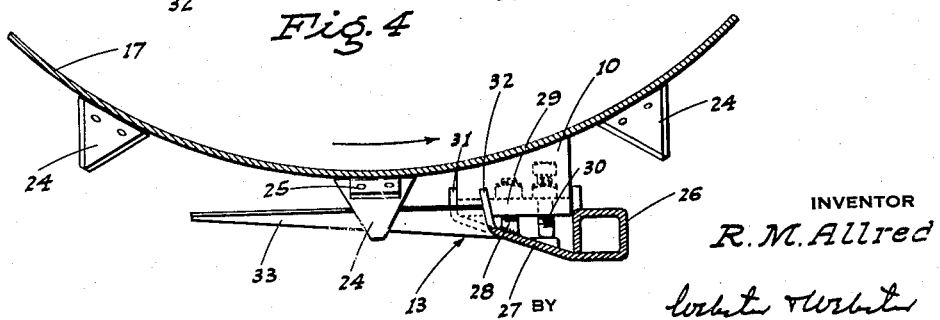
Fig. 4 is an enlarged fragmentary longitudinal section through the assembly shown in Fig. 3.

Referring now more particularly to the characters of reference on the drawings, the implement comprises a main frame, indicated generally at 1, adapted to be mounted on and to project rearwardly from a tractor in ground overhanging relation. Such main frame 1 includes a pair of transversely spaced, rearwardly projecting longitudinal beams 2 secured, at their forward ends, to a cross member 3, which in turn is attached, rigidly, to the axle housing 4 of a tractor which includes rear pneumatic tire wheels 5.

At their rear ends the longitudinal beams 2 are affixed to a corresponding pair of upstanding posts 6, which posts are interconnected, at the top, by a cross beam 7. Other longitudinal beams 8 are affixed to, and project rearwardly from, the posts 6 intermediate the ends of the same; and said beams 8 are connected, at their rear ends, by a cross beam 9.

A pair of transversely spaced, substantially vertical standards 10 are slidably engaged in guides 11 on the beams 8 rearwardly of the posts 6, whereby the standards 10 are capable of guided vertical and floating motion, such motion being simultaneous for the reason that the standards 10 are connected by a top bar 12, and additionally are connected, at their lower ends, by a transverse, cutter bar unit, indicated generally at 13.

The assembly of the standards 10 and cutter bar 13 is counterbalanced, for easy floating motion in response to ground contour, by means of tension springs 14 which extend upwardly from the standards 10 to adjustable connection, as at 15, with attachment brackets 16 mounted in connection with the cross beam 7.

A relatively large-diameter, rotary cutter drum 17 is disposed within the main frame 1, and includes a shaft 18 journaled in bearing blocks 19 on the standards 10 below the guides 11. The rotary cutter drum 17 is power actuated so that it turns at relatively high speed in the direction indicated by the arrow in Fig. 1; the power actuating mechanism comprising:

A countershaft 20 is journaled transversely in connection with the tractor at its rear end, and said counter shaft is rotated from the power take-off shaft (not shown) of the tractor by means of an endless drive 21. Another endless drive 22 extends from the countershaft 20 to the drum shaft 18, and a spring loaded belt tightener unit 23 maintains the endless drive 22 under proper tension in all positions of vertical adjustment of the rotary cutter drum.

The rotary cutter drum is fitted, on its periphery, with a plurality of transverse, circumferentially spaced rows of cutter blades 24; the blades radiating from the drum, and the blades of alternate rows being canted laterally in opposite directions, as shown. The cutter blades 24 are triangular in shape and are secured to the drum by means of attachment blocks 25, with their leading cutting edges diagonal to the path of rotation. As the cutter blades are triangular in shape with both leading and trailing sharpened edges, the drum can be run in one direction with the then leading edges of the cutting blades working, but when these edges dull, the drum can be reversely mounted in the main frame so that the other cutting edges are positioned to lead and work.

The rows of cutter blades 24 cooperate adjacent the bottom of their path of rotation with the transverse cutter bar unit 13, the latter comprising the following:

A transverse bar 26 extends horizontally from side to side of the implement, and said bar includes, for its full width, a forwardly and upwardly inclined ground engaging shoe 27, which shoe assures that the implement follows the ground contour at all times. At its ends the shoe 27 includes upstanding studs 28 secured to lateral flanges 29 extending outwardly from the lower ends of the standards 10; there being a vertical adjustment bolt 30 to the rear of each stud 28 working against the shoe 27, while upturned ears 31 on said shoe at the end ride the front edge of the flanges 29. By adjusting bolt 30 the cant or tilt of the shoe 27 may be varied as working conditions may require.

Between the ears 31, and thus substantially full width thereacross, the shoe 27 is formed, along its leading edge, with a row of symmetrical upwardly pointed or inverted V-shaped teeth 32 disposed for cooperation in cutting and shearing relation with the cutter blades 24. The cutter blades 24 which cant to the right cooperate with the right-hand edges of corresponding teeth 32, while the blades that cant to the left cooperate with the left-hand edges of corresponding teeth 32. In this manner an alternate right and left hand cutting action is accomplished by the assembly of the rotary cutter drum and the cutter bar unit 13, all to the end that better and more efficient cutting and chopping action is attained.

The cutter bar unit 13 includes longitudinal foliage pick-up fingers 33 affixed, as by welding, to each tooth 32, and thence projecting forwardly therefrom in tapering relation. A pair of supporting arms 34 are secured in normally fixed but vertically pivotally adjustable relation to the standards 10 directly above the cutter bar unit 13, as at 35. The supporting arms 34 project forwardly, and at their front ends carry rearwardly converging deflectors 36. The transverse cutter bar unit 13 supports, centrally of its ends, a deflector unit 37 which includes a pair of rearwardly diverging, upstanding vanes 38 whose front edges merge.

It should be noted that the blades 24 are secured to blocks 25 by riveting. This mounting of the blades enables them to be readily and quickly replaced when necessary from exteriorly of the drum and without dismantling the machine.

In operation of the above described implement, the tractor is driven in straddling relation to the asparagus row, with the shoe 27 running directly on top of said row. As the tractor advances, the converging deflectors 36 shift all of the asparagus heads or fern into the path of the rotary cutter drum 17.

As the asparagus fern is engaged by said drum it is swept by the cutter blades 24 across the cutter bar unit 13, with an alternate right and left-hand cutting action. This not only cuts the asparagus fern close to the ground, but effectively chops or comminutes it; the pieces as so chopped being discharged forcefully to the rear of the implement. At the rear of the implement the deflector unit 37 causes the chopped asparagus fern to deflect toward and to fall into the shallow ditches alongside the row. Once deposited in these ditches the chopped asparagus fern may be subsequently worked into the ground, to provide humus, by plowing or discing.

The longitudinal foliage pick-up fingers 33, with advance of the implement, act to pick up the asparagus fern and to assure its direct delivery between the cutter bar unit and the rotary cutter drum 17.

Under certain conditions the operator of the tractor may find it necessary, or desirable, to elevate the working parts of the implement, as for clearing a jam, to pass obstructions, etc. This is accomplished by a relatively longhand lever 39 accessible from the driver's seat on the tractor and thence extending rearwardly to fixed connection with a cross shaft 40 journaled on the under side of the cross beam 7. The cross shaft 40 includes rearwardly projecting lever arms 41 whose outer ends are pivotally attached by links 42 to the top bar 12 which connects the standards 10.

It will be seen that depression of the hand lever 39 at its forward end causes the standards 10, together with the drum 17 and cutter bar 13, to be lifted off the ground.

A hood 43 overlies the top portion of the drum 17 and is fixed in connection with the main frame 1; such hood preventing throw of the chopped fern, dirt, etc. in an upward direction.

It is desirable that the rotary cutter drum 17 be permitted of free rotation when the endless drives 21 and 22 are not in operation, and to this end a one-way clutch unit, indicated generally at 44, is interposed between the endless drive 22 and the drum shaft 18; such one-way clutch being shown generally in Fig. 5.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A foliage cutter and chopper for row crops comprising a frame adapted to be mounted on a tractor, a rotary cutter drum journaled on the frame for rotation about a transverse axis, driving connections between the tractor and the drum, and a transverse cutter bar unit mounted on the frame at the bottom thereof in cooperative relation to the corresponding portion of the rotary cutter drum; the rotary cutter drum including outwardly projecting blades thereon, and the cutter bar unit having upwardly projecting teeth with which the blades cooperate in foliage shearing relation, there being longitudinal, foliage pick-up fingers projecting forward from the cutter bar unit in transversely spaced relation.

2. An implement, as in claim 1, in which the cutter bar unit is adjustable to alter the elevation of the forward ends of said fingers.

3. A foliage cutter and chopper for row crops comprising a frame adapted to be mounted on a tractor, a rotary cutter drum journaled on the frame for rotation about a transverse axis, driving connections between the tractor and the drum, and a transverse cutter bar unit mounted on the frame at the bottom thereof in cooperative cutting relation to the corresponding portion of the rotary cutter drum; said cutter bar unit including a transversely extending, forwardly and upwardly inclined ground engaging shoe, said unit being upwardly toothed, and foliage pick-up fingers projecting forward from each tooth.

4. A foliage cutter and chopper for row crops comprising a frame adapted to be mounted on a tractor, a standard assembly mounted on the frame for vertical floating motion, a driven, rotary cutter drum journaled on said standard assembly for rotation about a transverse axis, and a transverse cutter bar unit mounted on the standard assembly below and in cooperative cutting relation to the bottom of the rotary cutter drum; a deflector unit including upstanding, rearwardly diverging deflector vanes whose forward edges substantially merge, and means mounting the deflector unit in fixed connection with the cutter bar unit and projecting rearwardly therefrom.

5. A foliage cutting and chopping machine comprising a supporting vehicle, a substantially horizontal frame fixed to the vehicle and extending outwardly therefrom, a substantially rectangular frame mounted in the horizontal frame for vertical floating movement relative thereto, said floating frame including a bottom cutter bar unit normally riding immediately adjacent the ground, and a rotary cutter drum journaled on the floating frame and cooperating in cutting relation with the cutter bar, and means to rotate the drum; with vertical guides mounted on the horizontal frame, the sides of the floating frame extending through the guides.

6. A machine as in claim 5 in which a pivoted lever is supported on the horizontal frame, the outer end of the lever being linked to the floating frame.

7. A machine as in claim 5 in which the cutter bar unit comprises shoes having under inclined faces riding the ground, the unit having cutter teeth projecting upwardly on an incline above the plane of the bottoms of the shoes.

8. A machine as in claim 7 including adjustment means for adjusting the inclination of the said under faces of the shoes.

9. A foliage cutting and chopping machine comprising a supporting vehicle, a substantially horizontal frame fixed to the vehicle and extending outwardly therefrom, a substantially rectangular frame mounted in the horizontal frame for vertical floating movement relative thereto, said floating frame including a bottom cutter bar unit normally riding immediately adjacent the ground, and a rotary cutter drum journaled on the floating frame and cooperating in cutting relation with the cutter bar, means to rotate the drum, and a pair of deflector plates having their inner ends fixed to the floating frame adjacent the center of the cutter bar unit flaring rearwardly and outwardly therefrom.

10. A foliage cutting and chopping machine comprising a frame adapted to be mounted on a tractor, a rotary cutter drum journaled on the frame for rotation about a transverse axis, a cutter bar unit mounted on the frame in cooperative relation to the cutter drum, the cutter drum including transverse circumferentially spaced rows of outwardly projecting blades of inverted V-shape, the blades in adjacent rows being canted laterally in opposite directions, the cutter bar unit including upwardly projecting teeth, the blades on the drum working in shearing relation with the teeth on the cutter bar unit, each of the blades which cant in one direction working with one edge of a corresponding tooth and each of the blades which cant in the opposite direction working with the opposite edge of such corresponding tooth, the blades having cutting edges disposed diagonally to a plane which is tangential to the surface of the drum.

11. A machine as in claim 10 in which the blades are double-edged, the leading edges working with the teeth of the cutter bar; the drum being reversibly mounted so that either of the double edges of the blades may be run in leading relation.

REED M. ALLRED.

REFERENCES CITED

The following references are of record in the file of this patent:

UNITED STATES PATENTS

| Number | Name | Date |
| --- | --- | --- |
| 770,793 | Blevins et al. | Sept. 27, 1904 |
| 1,020,614 | Luckhoff | Mar. 19, 1912 |
| 2,282,238 | Newton | May 5, 1942 |
| 2,322,076 | Watson | June 15, 1943 |
| 2,340,919 | Allen | Feb. 8, 1944 |
| 2,477,795 | Gehl | Aug. 2, 1949 |
| 2,538,643 | Gregory | Jan. 16, 1951 |